May 30, 1967 — L. A. SHUPE — 3,321,822
WOUND CORE METHOD
Filed June 1, 1965
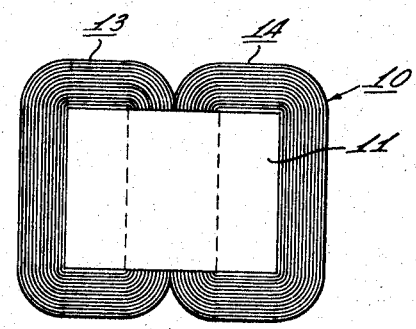
Fig. 1
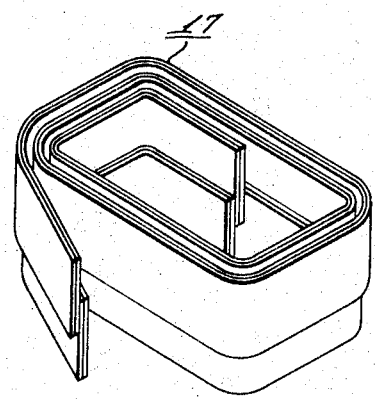
Fig. 4
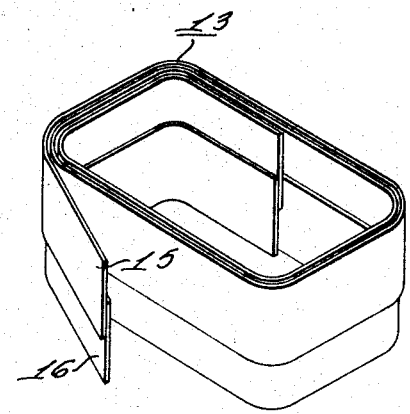
Fig. 2
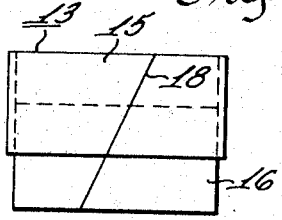
Fig. 3-a
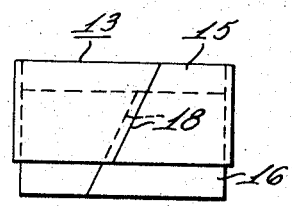
Fig. 3-b
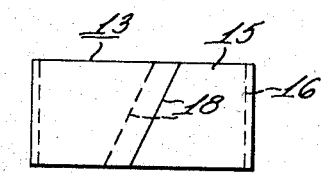
Fig. 3-c
Inventor
Leslie A. Shupe
By Robert B. Benson
Attorney

United States Patent Office 3,321,822
Patented May 30, 1967

3,321,822
WOUND CORE METHOD
Leslie A. Shupe, Pittsburgh, Pa., assignor to Allis-Chalmers Manufacturing Company, Milwaukee, Wis.
Filed June 1, 1965, Ser. No. 460,263
2 Claims. (Cl. 29—155.57)

This invention relates generally to electromagnetic induction apparatus. More specifically, this invention relates to a wound core made from magnetic strip material and to a method of making such a core in a way that the joints of the various strips are staggered to make a core having exceptionally good performance characteristics.

Wound cores made up from strips of magnetic material had to be cut before being placed around the coil of the induction apparatus. The joints formed by the separations in the various sheets form air gaps which greatly increase the reluctance in the magnetic path and thereby reduce the efficiency of the transformer. Many attempts have been made to improve the magnetic path at the point of junction such as by staggering the place where the various layers of material are joined, or by cutting the strips at an angle so as to vary the exact point at which the gap occurs. Additional problems are encountered in attempting to cut these cores to provide staggered joints because the core is initially wound on a mandrel and then reassembled around the coils of a transformer.

The core and method of this invention overcome the problems mentioned above by initially winding the core of at least two partially overlapping strips of magnetic material. After the core has been initially formed it is cut at an angle with the direction of winding of the core, then the overlapping strips are slid together so that the edges of the strips lie in the same or parallel planes. In this position, the joints in adjacent layers are staggered but parallel. Furthermore, with this unique arrangement of staggered joints it is much easier to assemble the core around the coil because you merely separate the core in the general area of the joints, place it around the core and the edges are riffled together, much as you would with a deck of cards, and they automatically assume their proper position. In the finished core the joints in adjacent layers are staggered from each other, but the end of the strips in each layer closely abut the ends in the other end of the same layer so as to form a minimum air gap in the core.

Therefore, it is the object of this invention to provide a new and improved core for electrical induction apparatus.

Another object of this invention is to provide a new and improved method of manufacturing a core for an electrical induction apparatus that makes the assembling of the core simpler and still provides a core having better magnetic characteristics.

Another object of this invention is to provide a new and improved magnetic core for electrical induction apparatus in which the end of a layer in the strip material that makes up the core is closely abutted to form a joint that is staggered from the joints in adjacent layers.

Other objects and advantages of this invention will be apparent from the following description when read in connection with the accompanying drawing, in which:

FIG. 1 is an end view of a transformer embodying the core of this invention;

FIG. 2 is a pictorial view of a core of this invention prior to being cut;

FIGS. 3a, b and c show the core after the various steps of winding, cutting and positioning this core in preparation for assembling it around the coil of the transformer; and FIG. 4 is a pictorial view of a core of an alternate embodiment of this invention.

Although the invention is illustrated in connection with a wound core type transformer, it is not intended to be limited to such a transformer.

The transformer 10 is made up generally of a coil 11 and two wound cores 13, 14. The cores are made up of continuous strips of high grade, grain oriented steel having excellent magnetic qualities. Specifically, the core of this invention as shown in FIG. 2 is made up of two strips of steel 15, 16 wound simultaneously on a mandrel. The strips are offset from but partially overlap each other. When a sufficient amount of strip steel has been wound to form the core it is cut along an angle 18 relative to the direction of travel of the strip steel so that the cut is not perpendicular to the strips of steel. After the cut has been made, the strips are pushed together so that they slide relative to each other until the edges of the strips are in side by side relation and lie in substantially parallel planes. In this position, such as illustrated in FIG. 3c, the joints in adjacent layers of the core are staggered.

In assembling these cores around the coil they may be inserted in the window of the coil and then riffled together. In some situations where a large core is involved, a portion of the core will have to be inserted first and then the remainder of the core later, but in any event individual laminations do not have to be separately fitted around the coil as needs to be done in some prior art type cores.

An alternate embodiment of the invention is illustrated in core 17 shown pictorially in FIG. 4. In this core, a plurality of laminations are used in each offset overlapping layer in the initial winding step. This is done in some cases to aid in assembling the core around the coil. The thickness of the laminations are so small that if only one lamination is used in each layer it may become difficult to interweave the overlapping ends of the laminations or strips to get them in their proper position. With two or more laminations in each layer, as shown in FIG. 2, the laminations can be wrapped in groups of two or more laminations which makes it easier to wrap the core around the coil.

In operation, two strips or core steel are wound around the mandrel in such a way that they are offset but partially overlapping each other. When the entire core has been wound, a cut is made at an angle relative to the direction of winding of the core at approximately a 45° angle. Then the strips are slid together so that the edges of all of the strips terminate in parallel planes. The ends of each lamination or layer are in close abutting relation to form mitered joints, but the joints in adjacent layers are offset relative to each other.

Although but two embodiments of this invention have been illustrated and described, it will be apparent to those skilled in the art that various modifications and changes can be made therein without departing from the spirit of the invention or the scope of the appended claims.

The embodiments of the invention in which an exclusive property or privilege is claimed are defined as follows:

1. The method of forming a core for an electrical induction apparatus comprising the steps of: winding a pair of offset but partially overlapping strips of magnetic sheet steel into an annulus; cutting said wound strips at an oblique angle relative to the longitudinal direction of said strips to form butt joints in each layer of said strips; sliding said strips toward each other so that they assume a fully overlapping position with the edges of said strips lying in parallel planes; positioning said core around one leg of an electric coil so that said butt joints in adjacent layers are staggered.

2. The method of forming a core for an electrical induction apparatus comprising the steps of: positioning a plurality of strips of magnetic sheet steel into a pair of partially overlapping sets of laminations; winding said sets into an annulus; cutting each layer of said strips at an oblique angle relative to the longitudinal direction of said strips to form butt joints in each layer of said strips; sliding said strips toward each other so that they assume a fully overlapping position with the edges of said strips lying in parallel planes; positioning said core around one leg of an electric coil so that said butt joints in adjacent layers of said sets are staggered.

References Cited

UNITED STATES PATENTS

| | | | |
|---|---|---|---|
| 2,477,350 | 7/1949 | Somerville | 336—213 X |
| 2,486,220 | 10/1949 | Somerville | 336—213 X |
| 3,008,222 | 11/1961 | Steinmayer | 336—217 X |

LEWIS H. MYERS, *Primary Examiner.*

T. J. KOZMA, *Assistant Examiner.*